United States Patent
Isgar

(10) Patent No.: US 10,511,715 B1
(45) Date of Patent: *Dec. 17, 2019

(54) TELEPHONE CALL-BACK DEVICE

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/291,143

(22) Filed: Mar. 4, 2019

Related U.S. Application Data

(63) Continuation-in-part of application No. 15/996,364, filed on Jun. 1, 2018, now Pat. No. 10,257,349.

(60) Provisional application No. 62/588,009, filed on Nov. 17, 2017.

(51) Int. Cl.
*H04M 3/42* (2006.01)
*H04M 3/436* (2006.01)
*H04M 1/2745* (2006.01)
*H04M 3/22* (2006.01)

(52) U.S. Cl.
CPC ..... *H04M 3/436* (2013.01); *H04M 1/274575* (2013.01); *H04M 3/2281* (2013.01); *H04Q 2213/13152* (2013.01)

(58) Field of Classification Search
CPC ......... H04M 3/42025; H04M 3/42195; H04M 3/42348; H04M 3/424; H04M 1/274575; H04M 3/2281; H04M 3/436; H04Q 2213/13152
USPC .................................................... 379/210.01
See application file for complete search history.

(56) References Cited

U.S. PATENT DOCUMENTS

| | | | |
|---|---|---|---|
| 9,912,688 B1* | 3/2018 | Shaw | H04W 28/02 |
| 10,257,349 B1* | 4/2019 | Isgar | H04M 3/42195 |
| 2009/0238345 A1* | 9/2009 | Cha | H04M 1/654 |
| | | | 379/88.12 |
| 2017/0013122 A1* | 1/2017 | Cohen | H04M 3/436 |
| 2017/0099388 A1* | 4/2017 | Bensman | H04M 3/436 |

* cited by examiner

*Primary Examiner* — Harry S Hong
(74) *Attorney, Agent, or Firm* — Schmeiser, Olsen & Watts LLP

(57) ABSTRACT

Disclosed is a telephone call-back device that can provide a means for the recipient of a robocall incoming phone call to take action. The telephone call-back device includes an activation device, a call source utility, and a call-back utility. The activation device is a button or switch that a user can activate when they receive a robocall. Once the activation device is activated, the call source utility identifies a source phone number of the robocall incoming phone call. The call-back utility initiates one or more robo call-back outgoing phone calls to be sent to the source phone number. The call-back utility can be programmed to try to send many robo call-back outgoing phone calls to the source phone number to try to swamp the phone number with robo call-back outgoing phone calls. The system may provide satisfaction to the user as a tool to respond to these on-going nuisances.

14 Claims, 4 Drawing Sheets

TELEPHONE CALL-BACK DEVICE

CROSS REFERENCE TO RELATED APPLICATION[S]

This application is a continuation-in-part of U.S. patent application entitled "TELEPHONE CALL-BACK DEVICE," Ser. No. 15/996,364, filed Jun. 1, 2018, which claims priority to U.S. Provisional Patent Application entitled "TELEPHONE CALL-BACK DEVICE," Ser. No. 62/588,009, filed Nov. 17, 2017, the disclosure of which is hereby incorporated entirely herein by reference.

BACKGROUND OF THE INVENTION

Technical Field

This invention relates to telephone accessories, and specifically to a device which sends return phone calls to the source of robocalls.

State of the Art

Robocalls are phone calls initiated by computers. The recipient may receive a computerized message or may be transferred to a human once the call is answered. Robocalls are very annoying because of their frequency and the inability of the recipient to get the calls to stop.

Accordingly, what is needed is a device that initiates one or more return calls be sent to the source of robocalls.

DISCLOSURE OF THE INVENTION

The disclosed invention relates to telephone accessories, and specifically to a device which sends return phone calls to the source of robocalls.

Disclosed is a telephone call-back device that is used to send a series of phone calls to a source of robocall incoming phone calls. The telephone call-back device includes an activation device coupled to a phone line. The activation device can be a button (for example) that a recipient presses when the recipient determines that a call is a robocall incoming phone call. The telephone call-back device includes a call source utility that determines a source phone number of the robocall incoming phone call. The telephone call-back device also includes a call-back utility. The call-back utility sends at least one robo call-back outgoing phone call to the source phone number. The call-back utility can attempt to swamp the source phone number with robo call-back outgoing phone calls within state regulations.

Disclosed is a method of responding to a robocall incoming phone call that includes identifying a source phone number of a robocall incoming phone call received by a phone and initiating one or more robo call-back outgoing phone calls to the source phone number.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to telephone accessories, and specifically to a device which sends return phone calls to the source of robocalls.

A robocall incoming phone call is a call received on a phone that is made by a computer or initiated by a computer. It can be very annoying to receive a robocall incoming phone call. Many robocall incoming phone calls have a computer at the other end, so there is nobody for the recipient to speak to, no way to tell them to remove your phone number, and no way to stop the robocalls. Disclosed is a telephone call-back device that can provide a measure of satisfaction to the recipient of robocall incoming phone calls. The telephone call-back device includes an activation device, a call source utility, and a call-back utility. The activation device is a button or switch that the user or owner of the telephone call-back device can activate when they receive a robocall incoming phone call. Once the activation device is activated, the call source utility identifies a source phone number of the robocall incoming phone call. The source phone number is the phone number of the source entity that sent the robocall incoming phone call, spam incoming call, nuisance incoming call, and/or the like. The call-back utility initiates one or more robo call-back outgoing phone calls to be sent to the source phone number. The call-back utility can be programmed to try to send many robo call-back outgoing phone calls to the source phone number to try to swamp the phone number with robo call-back outgoing phone calls. The robo call-back outgoing phone calls may or may not affect the source entity or the source phone number but may rather be a self-help system that may bring some feeling of satisfaction to the recipient of the robocall incoming phone call. While it is discussed that this is useful for robocalls, it will be appreciated that this system can be used for any annoying or unwanted phone calls from computers or human spammers, so long as such use is within the laws of the land. The use of the system provides consumer satisfaction by calling back in order to deal with nuisance of the robocalls or spam calls in that there is an activity for them to respond.

Figure 1:
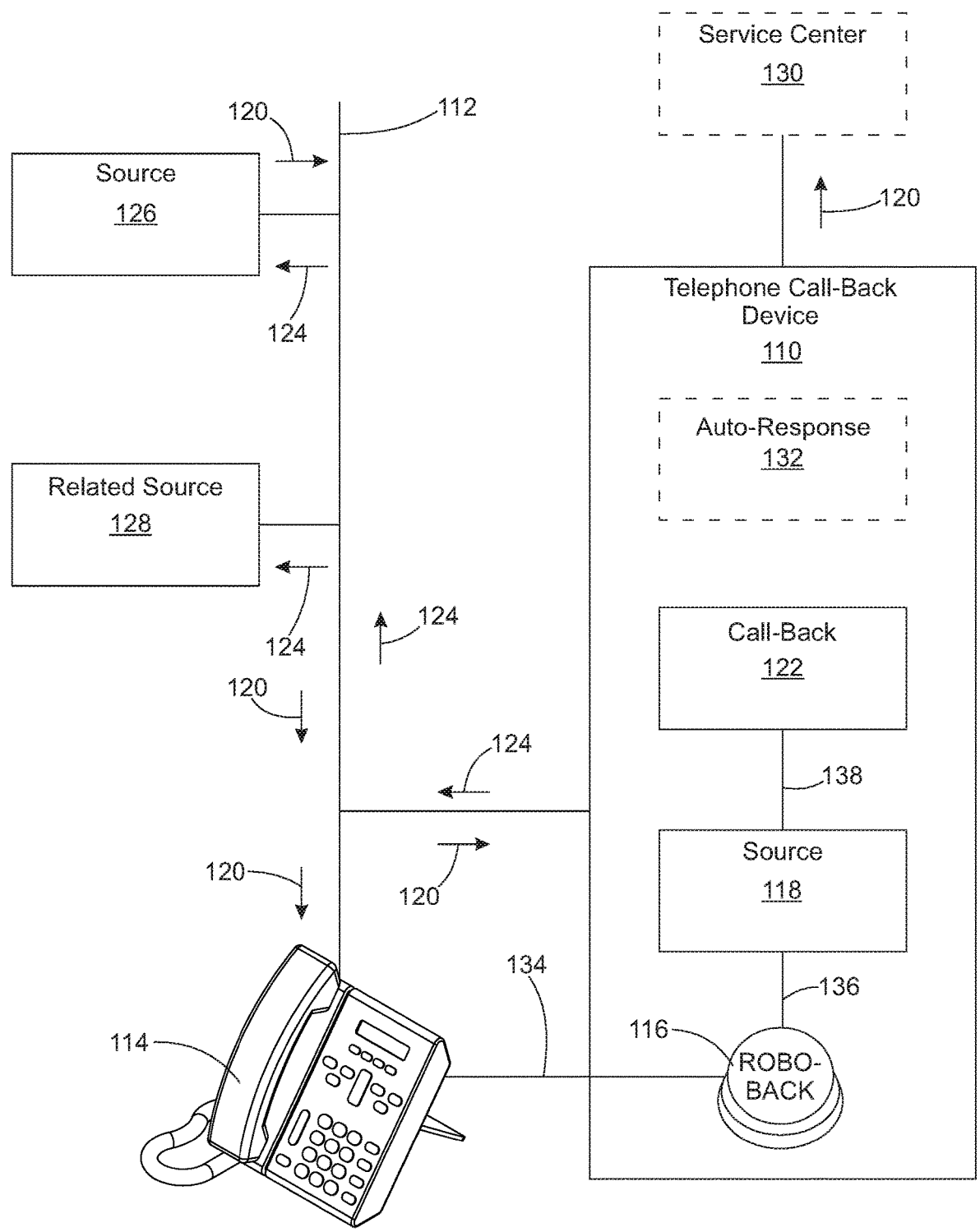
FIG. 1 shows a simplified diagram of a telephone call-back device coupled to a phone, according to an embodiment.

FIG. 1 shows a simplified block diagram of a telephone call-back device 110 coupled to a phone 114. Telephone call-back device 110 includes an activation device 116, a call source utility 118, and a call-back utility 122.

Figure 3:
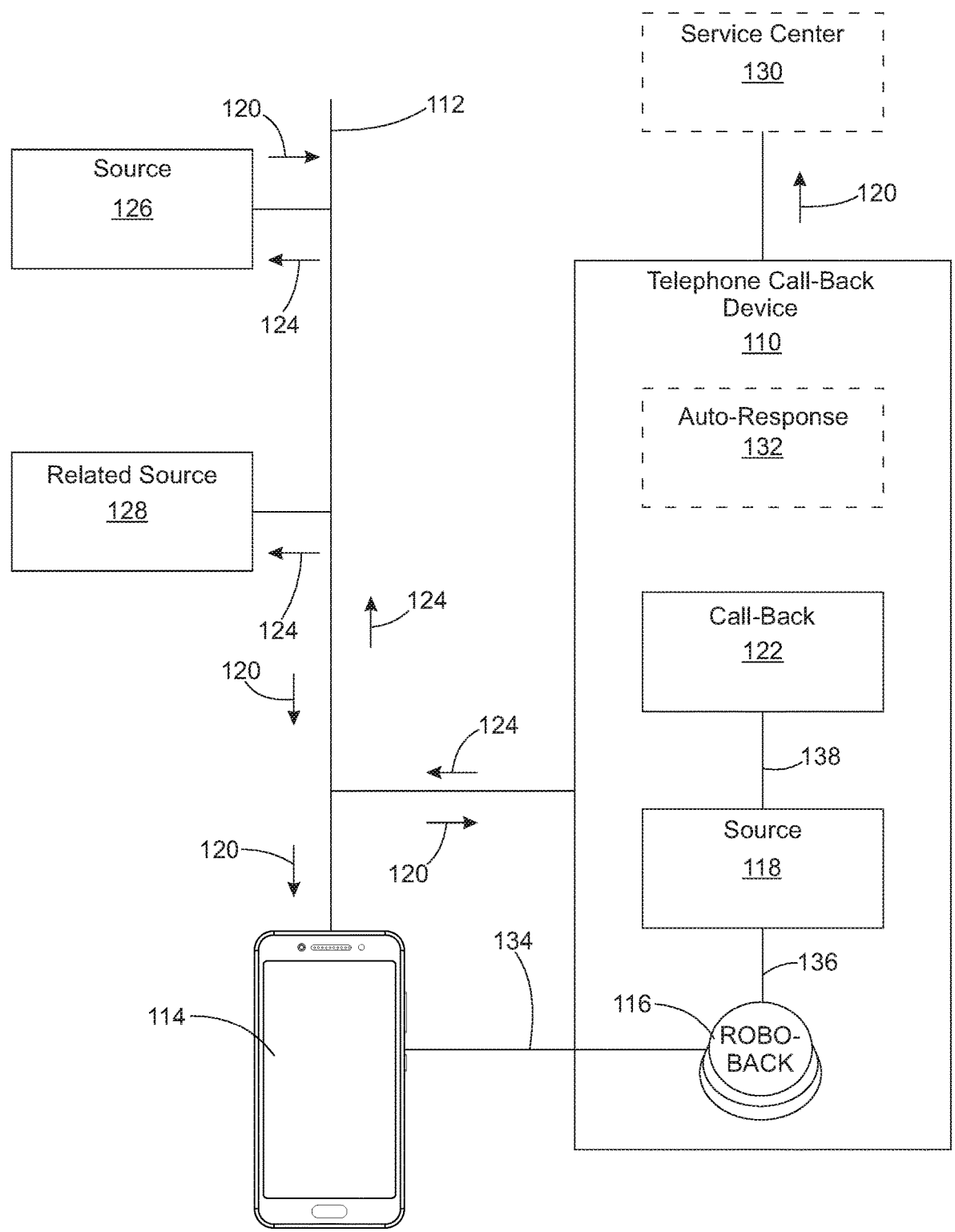
FIG. 3 shows a simplified diagram of a telephone call-back device coupled to a phone, according to an embodiment.

Telephone call-back device 110 and phone 114 are both coupled to a phone line 112. Phone line 112 is a communication link that conducts phone calls to phone 114. In this embodiment, phone 114 is a landline phone, and phone line 112 is a wired communication link (a landline), but this is not meant to be limiting. In some embodiments, phone 114 is a smartphone as depicted in FIG. 3 and phone line 112 is a wireless communication link. Telephone call-back device 110 is a device that contains software, hardware, and firmware, in this embodiment, but this is not meant to be limiting. Telephone call-back device 110 can be an app on a smartphone with the activation button 116 being a soft-button displayed on the screen of the smartphone as depicted in FIG. 3, for example, or any other combination of software, hardware, and firmware. The operation of embodiments on the invention as a smartphone 114, as shown in FIG. 3, operate in the same fashion as described below. However, the application that performs the operation converts the smartphone into the call-back device 110.

Phone line 112 conducts a robocall incoming phone call 120 to phone 114. Robocall incoming phone call 120 is sent from a source entity 126 having a source phone number. Once a recipient of robocall incoming phone call 120 realizes they have received a robocall, they can activate activation device 116 of telephone call-back device 110 to initiate a response using telephone call-back device 110.

Activation device 116 can be any button or switch or other type of activation device that can be used to begin a process. In this embodiment, activation device 116 is a button that a user will physically press when a robocall incoming phone call 120 is received. Activation device 116 is separate from phone 114 in the embodiment shown in the figures, but this is not meant to be limiting. In some embodiments, activation device 116 is coupled to or a part of phone 114. In some embodiments, activation device 116 is a soft button on a display or any other type of device that can inform telephone call-back device 110 that the recipient has received robocall incoming phone call 120. In the embodiment shown in the figures, activation device 116 is communicatively coupled to phone 114 using a hardwire communication link 134, but this is not meant to be limiting. In some embodiments, communication link 134 is a wireless communication link. In some embodiments, the activation device may have a display that displays call information, such as the robocall number, whether the number is associated with a spam caller and the like.

Activation device 116 is a means for the recipient of robocall incoming phone call 120 to begin a sequence for determining who sent the robocall, and then for sending robo call-backs to the source. In some embodiments, activation device 116 can make a beep or a noise on phone line 112 that can be used to annoy humans who are involved in sending robocall incoming phone call 120. Activation device 116 is a push button in the embodiment shown in the figures. When the recipient pushes activation device 116, telephone call-back device 110 is informed that the recipient has received a robocall incoming phone call 120.

Once activation device 116 is activated, call source utility 118 determines the source phone number of robocall incoming phone call 120. Call source utility 118 is communicatively coupled to activation device 116 using a communication link 136. The source phone number is the phone number of source entity 126 that sent robocall incoming phone call 120. In some embodiments, call source utility 118 determines one or more related phone numbers. Related phone numbers are other phone numbers used by source entity 126, or phone numbers for related source entities 128. Related source entities 128 are one or more other entities that are related to, owned, governed, or controlled by, source entity 126, for example. Related phone numbers are searched for because often a source entity 126 has multiple numbers associated with it and may have set up multiple companies or entities in an attempt to hide the source of robocalls. Call source utility 118 can be software, firmware, hardware, or any combination of these. For example, the call source utility 118 may be an app operating on a mobile phone, a programmed hardware operating on a landline phone, or the like.

Further, in embodiments, the robo call-back device 110 may be configured to substantially simultaneously send the identified incoming nuisance number to a junk/nuisance call database and send a robo call-back call to the nuisance number. Further, the device 110 may be configured to automatically add the nuisance number to a blocked caller list on the phone. Further still, the call source utility 118 may be programmed to emit a tone or message on the user's phone to alert the user that the robo call-back device 110 has been activated and is in operation. The robo call-back system can be manually activated by the user at any time to respond to a nuisance call. The system may also be activated after a nuisance call is recognized by other junk call screening systems that may reject a call and the user desires to send a robo call-back response.

It will be appreciated that the system, in accordance with some embodiments, will comply with local and national phone and communication rules and laws.

Call-back utility 122 is communicatively coupled to call source entity 118 using a communication link 138, which can be a wired or a wireless communication link. Once call source utility 118 determines the source phone number, call-back utility 122 sends one or more robo call-back outgoing phone calls 124 to the source phone number. Call-back utility 122 can be programmed to send a series of robo call-back outgoing phone calls 124 to the source phone number and source entity 126.

Figure 4:
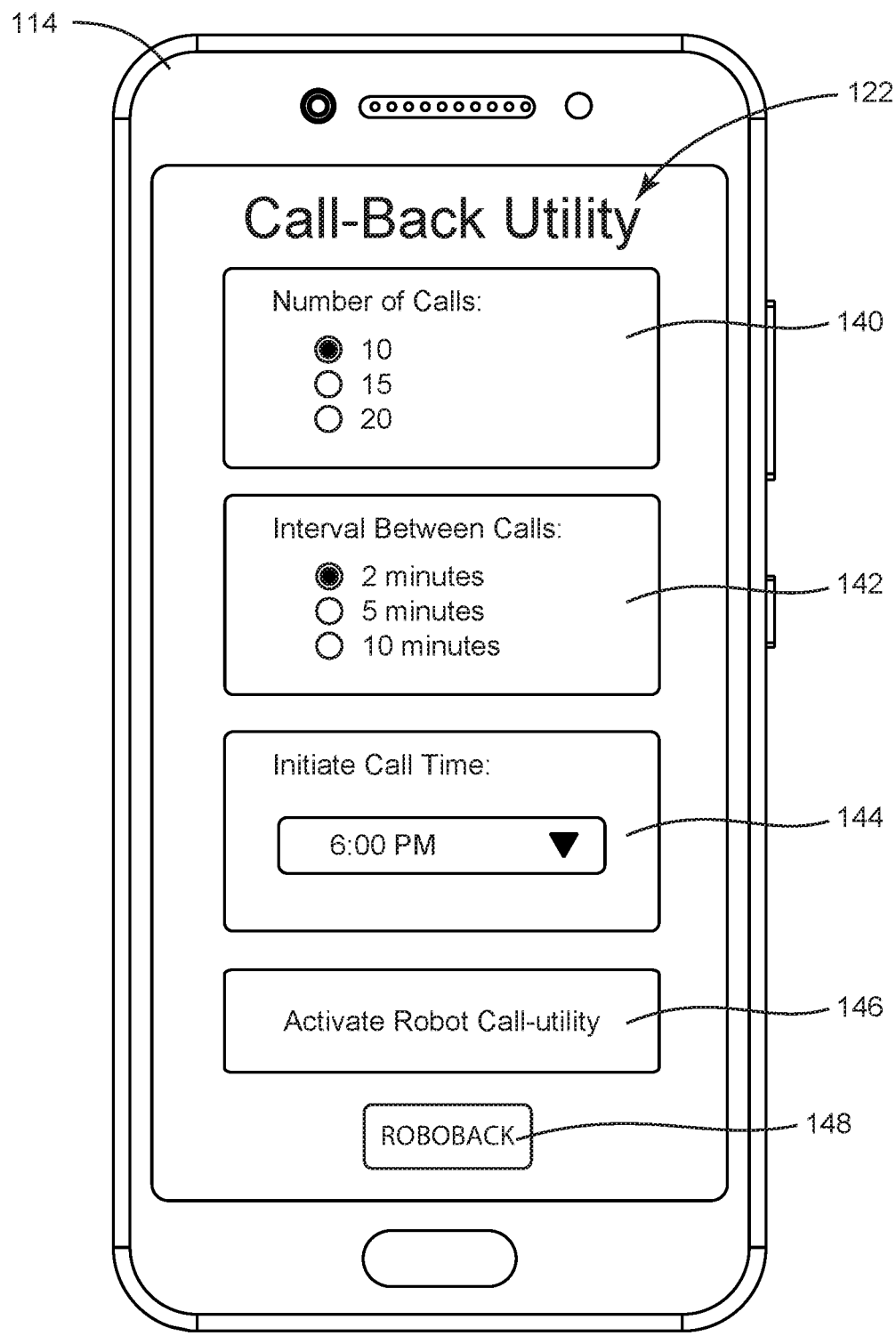
FIG. 4 shows a front view of a mobile phone utilizing a call-back utility of a system, according to an embodiment.

In an embodiment, the call-back utility 122 may be programmed to send a certain number of robo call-back outgoing phone calls to the source phone number. For example, the call-back utility 122 may be programmed to send a predetermined number of robo call-back outgoing phone calls to the source phone number, and/or the call-back utility 122 may be programmed to send a user-determined number of robo call-back outgoing phone calls to the source phone number. The user-determined number of calls may be accomplished by use of a call-back utility 122 user interface displayed on the user device 114, wherein the call-back utility 122 includes a "Number of Calls" interface 140 for receiving input from the user and sending the user input to the server 112 for storing as a preference for the user device 114. The stored preference may then be used by the system 100 to initiate the number of robo call-back outgoing phone calls to the source phone number, such as to a nuisance caller's line, as selected by the user (such as selecting between 10, 15, or 20 calls using radio buttons as depicted in FIG. 4). The number of calls may be any number of calls as determined by the user and the number of calls and method of selection depicted in FIG. 4 are for exemplary purposes and are not provided as a limitation.

In an embodiment, the call-back utility 122 may be programmed to send the programmed number of robo call-back outgoing phone calls to the source phone number with certain timing or time intervals between each call of the number of robo call-back outgoing phone calls. For example, the call-back utility 122 may be programmed to send a predetermined time between each call of the number of robo call-back outgoing phone calls to the source phone number, and/or the call-back utility 122 may be programmed to send each call of number of robo call-back outgoing phone calls to the source phone number at a time interval between calls as selected by the user. The user-determined timing between calls may be accomplished by use of a call-back utility 122 user interface displayed on the user device 114, wherein the call-back utility 122 includes an "Interval Between Calls" interface 142 for receiving input from the user and sending the user input to the server 112 for storage as a preference for the user device 114. The stored preference may then be used by the system 100 to initiate the number of robo call-back outgoing phone calls to the source phone number, such as to a nuisance caller's line, at the time interval as selected by the user (such as selecting between 2 minutes, 5 minutes, or 10 minutes between calls using radio buttons as depicted in FIG. 4). The time intervals may be any time interval selected by the user. The intervals and the method of selection depicted and in FIG. 4 are for exemplary purposes and not as a limitation.

In an embodiment, the call-back utility 122 may be programmed to initiate the programmed number of robo call-back outgoing phone calls to the source phone number at a certain time. For example, the call-back utility 122 may be programmed to initiate sending calls at a predetermined time and/or the call-back utility 122 may be programmed to initiate sending the number of robo call-back outgoing phone calls to the source phone number at a time selected by the user. The user-determined call initiating time may be accomplished by use of a call-back utility 122 user interface displayed on the user device 114, wherein the call-back utility 122 includes an "Initiate Call Time" interface 144 for receiving input from the user and sending the user input to the server 112 for storage as a preference for the user device 114. The stored preference may then be used by the system 100 to initiate the number of robo call-back outgoing phone calls to the source phone number, such as to a nuisance caller's line, at the time as selected by the user (such as selecting a time of initiation using a dropdown box as depicted in FIG. 4). The time for initiating calls may be immediate or any time selected by the user. The method of selection depicted in FIG. 4 is for exemplary purposes and not as a limitation.

Also, the user may manually activate the system 100 as frequently and as often as desired, to send out a response to the nuisance caller line, wherein the response may be a programmed and/or non-programmed response. For example, and without limitation, the call-back utility 122, as shown in FIG. 4, may include a manual activation button 148 that manually activates the system prior to, when receiving, and after answering a robocall or nuisance call. If one or more related phone numbers and/or related entities 128 have been identified, call-back utility 122 can send one or more robo call-back outgoing phone calls 124 to the related numbers also. The robo call-back outgoing phone calls 124 may or may not cause a distraction or a disruption to source entity 126 or related entities 128, but they can make the recipient of robocall incoming phone call 120 feel like they have done something to push back against robocall incoming phone call 120 and source entity 126. Call-back utility 122 can be software, firmware, hardware, or any combination of these.

The call-back utility 122 may be programmed to receive and record a user-generated message or select a supplied message. This may be any "Warning: Do not call" message spoken by the user, a supplied message, a tone, a noise, or any audio sound that the user wishes to be played when the robo call-back call is sent to the nuisance caller's line. The tone may be audible to the sender, thereby reporting that the warning has been sent. Another embodiment may include the call-back utility 122 having a robotic program to engage the nuisance caller and consume the nuisance caller's time, thereby discouraging calling the user's number.

In some embodiments, telephone call-back device 110 includes an auto-response utility 132. Auto-response utility 132 will identify known source phone numbers to the recipient as robocall incoming phone call 120 is being received. In this embodiment, the recipient is thus warned beforehand that the incoming call is robocall incoming phone call 120. In this embodiment, once activation device 116 is activated, auto-response utility 132 will answer the call with a robo-answer. Auto-response utility 132 can be software, firmware, hardware, or any combination of these. For example, and without limitation, call-back utility 122 (see FIG. 4) may include an activate auto-response utility interface 146, which as displayed in FIG. 4 is labeled "Activate Robot Call-utility", wherein user selection of the auto-response call utility interface 142 initiates the auto response utility 132. This can be done prior to or after answering of an incoming robocall or nuisance phone call. The robo-answer may be programmed by the user or pre-programmed by the system to engage the incoming robocall or actual person on the call, in attempts to prolong the connection between the source phone number and the user's phone number as long as possible. The robo-answer may accomplish this by mimicking a human interaction with the incoming caller.

In some embodiments, telephone call-back device 110 is communicatively coupled to a service center 130. Telephone call-back device 110 can send the source phone number and/or robocall incoming phone call 120 to service center 130. Service center 130 can log robocalls and, in some embodiments, can initiate processes and procedures to investigate and enforce laws, block calls, or otherwise perform a more comprehensive response to robocall incoming phone call 120.

Figure 2:
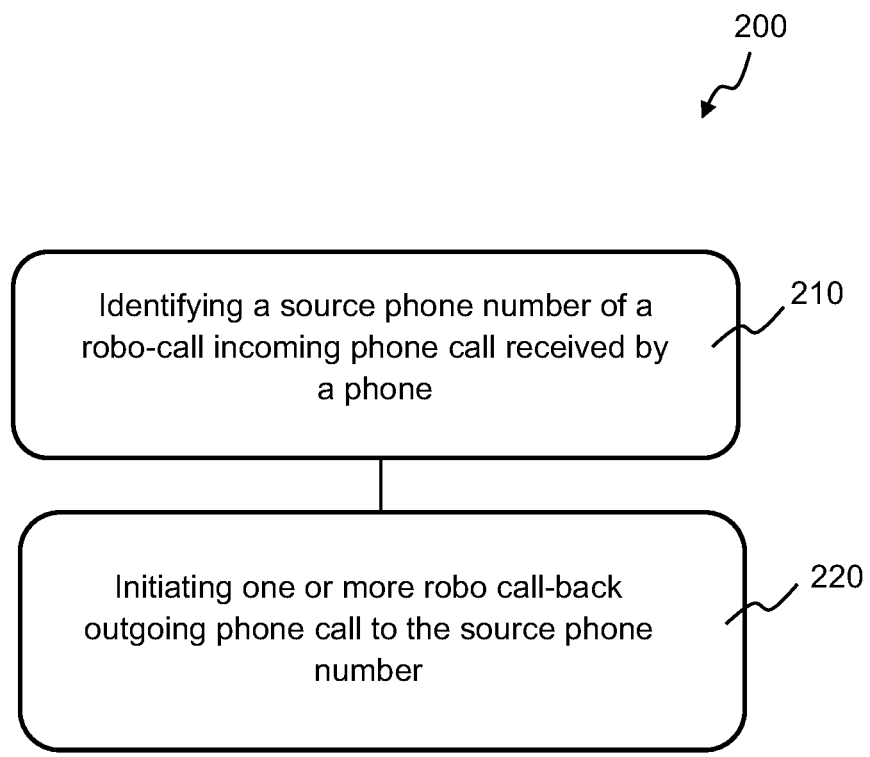
FIG. 2 shows a method of responding to a robocall incoming phone call, according to an embodiment.

FIG. 2 illustrates a method 200 of responding to a robocall incoming phone call. Method 200 includes an act 210 of identifying a source phone number of a robocall incoming phone call received by a phone. The phone can be a landline or a wireless phone.

Method 200 also includes an act 220 of initiating one or more robo call-back outgoing phone calls to the source phone number within state regulations. The robo call-back outgoing phone calls may be sent to annoy the source of the robocall incoming phone call and clog the source phone number.

In some embodiments, method 200 includes determining at least one related phone number, where the at least one related phone number is related to the source phone number. In some embodiments, method 200 includes sending one or more robo call-back outgoing phone calls to the at least one related phone number.

In some embodiments, method 200 includes sending the source phone number to a service center. In some embodiments, method 200 includes investigating, by the service center, the source phone number; and taking comprehensive action as a result of the robocall incoming phone call. In some embodiments, method 200 includes providing an investigation report related to the robocall incoming phone call. The report can be provided to the recipient of the robocall incoming phone call, to the police, or to another group that can take action.

In some embodiments, method 200 includes providing, by an auto-response utility, an automated call answer to the robocall incoming phone call.

Embodiments may be available on or through the internet, such as through domain names reserved and owned by Applicant that include flipthespam.com, RoboBack.com, Robo-Back.com, BotBack.com, Bot-Defense.com, Robo-Defense.com, Robo-Answer.com or the like.

It will be understood that the call-back device 110 may operate as a computing device being programmed to perform the functions described in this disclosure. As such it will be appreciated, by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special-purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A telephone call-back device comprising:
   an activation device coupled to a phone line and phone:
   a call source utility coupled to the activation device, wherein the call source utility identifies a source phone number of an incoming phone call received by the phone, regardless of whether the incoming phone call is answered or not answered, in response to the activation device being activated;
   a call-back utility coupled to the call source utility, wherein the call-back utility sends at least one robo call-back outgoing phone call to the source phone number in response to the call source utility identifying the source phone number, and wherein the callback utility is programmed to send a user determined number of robo call-back outgoing phone calls to the source phone number in response to the call source utility identifying the source phone number.

2. The device of claim 1, wherein the call-back utility is programmed to include a user determined time of day to initiate the number of robo call-back outgoing phone calls.

3. The device of claim 1, wherein the call-back utility is programmed to include user determined timing between each call of the number of robo call-back outgoing phone calls.

4. The device of claim 1, wherein the call-back utility is programmed to robotically engage a nuisance caller associated with the source phone number to consume the nuisance caller's time.

5. The device of claim 1, wherein the call source utility determines related phone numbers of the incoming phone call.

6. The device of claim 5, wherein the call-back utility sends one or more robo call-back outgoing phone calls to the source phone number and the related phone numbers.

7. The device of claim 1, further comprising an auto-response utility.

8. The device of claim 7, wherein the auto-response utility identifies known source phone numbers to the recipient as the incoming phone call is being received.

9. The device of claim 8, wherein the auto-response utility warns the recipient that the incoming phone call is an undesired incoming phone call.

10. The device of claim 9, wherein activation of the activation device results in the auto-response utility answering the call with a robo-answer.

11. The device of claim 1, wherein the telephone call-back device is communicatively coupled to a service center.

12. The device of claim 11, wherein telephone call-back device sends the source phone number and incoming phone call to service center.

13. The device of claim 12, wherein the service center logs the incoming phone call.

14. The device of claim 13, wherein the service center initiates processes and procedures to investigate and enforce laws, block calls, or otherwise perform a more comprehensive response to the incoming phone call.

* * * * *